(12) United States Patent
Murdock

(10) Patent No.: US 8,876,482 B2
(45) Date of Patent: Nov. 4, 2014

(54) ELECTRICAL GROUNDING FOR BLADE SHEATH

(75) Inventor: James R. Murdock, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 3 days.

(21) Appl. No.: 13/610,100

(22) Filed: Sep. 11, 2012

(65) Prior Publication Data

US 2014/0069077 A1    Mar. 13, 2014

(51) Int. Cl.
  *F01D 5/14*     (2006.01)
  *F01D 5/22*     (2006.01)
  *B64C 11/20*    (2006.01)

(52) U.S. Cl.
  USPC .................. 416/229 R; 416/224; 416/229 A; 416/223 A; 60/39.091; 60/226.1; 60/805; 361/218; 244/1 A

(58) Field of Classification Search
  USPC .............. 60/39.091, 226.1, 805; 416/29, 224, 416/229 A, 229 R, 223; 361/218, 212; 244/1 A; 29/889.7, 889.71
  See application file for complete search history.

(56) References Cited

U.S. PATENT DOCUMENTS

| | | | | |
|---|---|---|---|---|
| 4,755,904 A | * | 7/1988 | Brick | 361/117 |
| 4,784,575 A | * | 11/1988 | Nelson et al. | 416/226 |
| 4,944,655 A | * | 7/1990 | Merz | 416/61 |
| 5,123,813 A | | 6/1992 | Przytulski et al. | |
| 5,165,856 A | * | 11/1992 | Schilling et al. | 416/204 R |
| 5,222,297 A | * | 6/1993 | Graff et al. | 29/889.71 |
| 5,863,181 A | * | 1/1999 | Bost et al. | 416/224 |
| 6,004,101 A | | 12/1999 | Schilling et al. | |
| 6,224,016 B1 | * | 5/2001 | Lee et al. | 244/30 |
| 7,399,159 B2 | | 7/2008 | Matheny et al. | |
| 7,780,419 B1 | | 8/2010 | Matheny et al. | |
| 8,133,031 B2 | * | 3/2012 | Arinaga et al. | 416/229 R |
| 2011/0142644 A1 | | 6/2011 | Fritz et al. | |
| 2011/0211967 A1 | * | 9/2011 | Deal et al. | 416/224 |
| 2012/0003100 A1 | * | 1/2012 | James et al. | 416/230 |
| 2012/0082553 A1 | | 4/2012 | Eleftheriou et al. | |

(Continued)

FOREIGN PATENT DOCUMENTS

| | | |
|---|---|---|
| EP | 2353830 | 8/2011 |
| EP | 2405101 | 1/2012 |

OTHER PUBLICATIONS

Henkel Corporation Aerospace Group, Hysol® EA 9628, Jan. 2001, p. 4.*
Ashby, Materials Selection in Mechanical Design, 2010, 4th Edition, Elsevier, Appendix A.*

(Continued)

*Primary Examiner* — Ehud Gartenberg
*Assistant Examiner* — Jason H Duger
(74) *Attorney, Agent, or Firm* — Carlson, Gaskey & Olds, PC

(57) ABSTRACT

A blade for use in a gas turbine engine has an airfoil including a leading edge and a trailing edge. A sheath is positioned at the leading edge and secured to the airfoil by a first adhesive formed of a first material. The sheath is formed of a second material that is distinct from said first material. The first material is less electrically conductive than the second material. A grounding element is in contact with the sheath. The grounding element is in contact with a portion of the airfoil formed of a third material that is more electrically conductive than the first material. The grounding element and the portion of the airfoil together form a ground path from the sheath into the airfoil.

17 Claims, 3 Drawing Sheets

(56) References Cited

U.S. PATENT DOCUMENTS

| | | |
|---|---|---|
| 2012/0152893 A1 | 6/2012 | Parkos et al. |
| 2014/0069109 A1* | 3/2014 | Murdock .................... 60/805 |
| 2014/0083080 A1* | 3/2014 | Hansen et al. ............ 60/226.1 |

OTHER PUBLICATIONS

European Search Report for European Patent Application No. 12196763.2 completed Feb. 6, 2013.

International Search Report and Written Opinion for International Application No. PCT/US2013/057972 completed on Jul. 9, 2014.

* cited by examiner

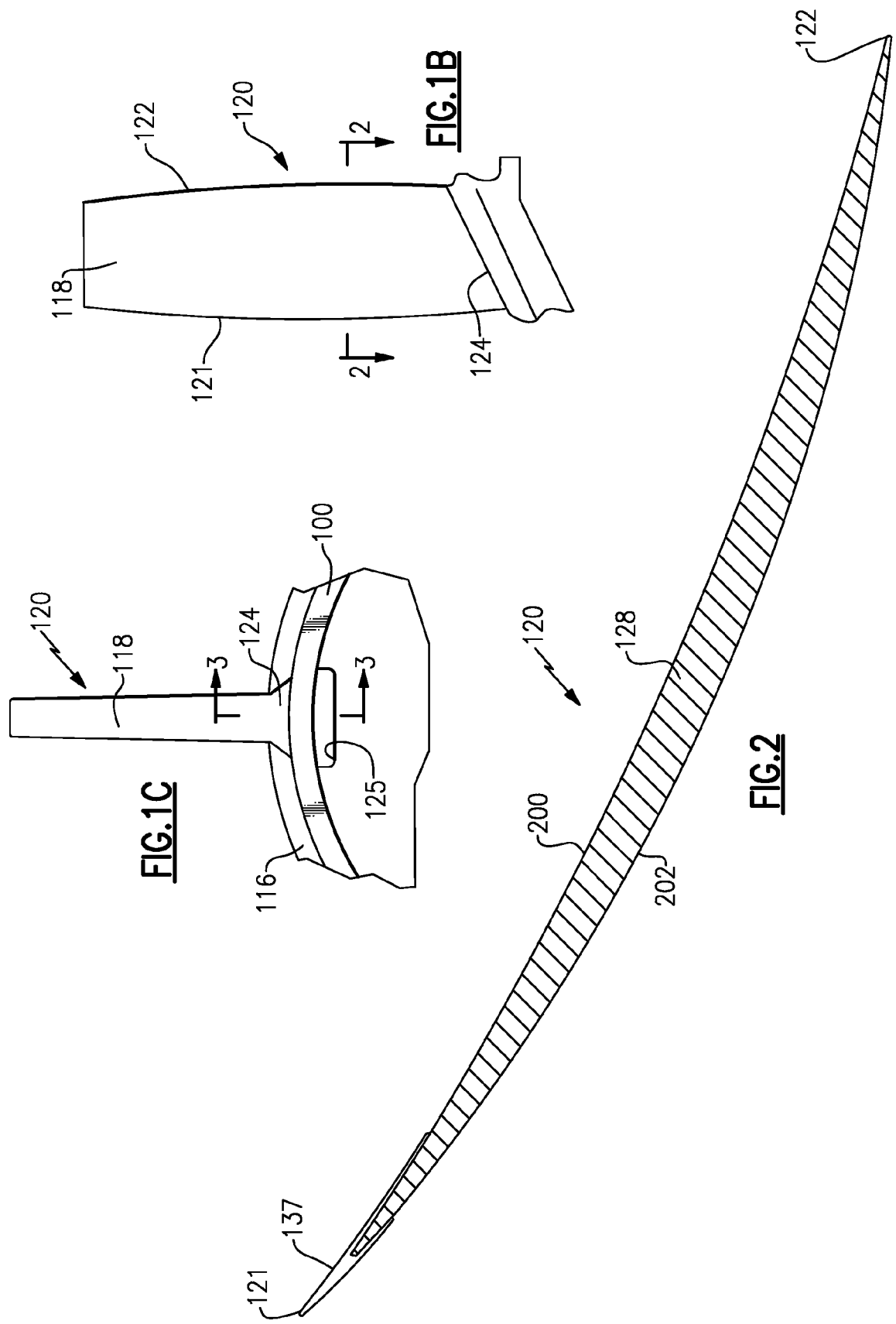

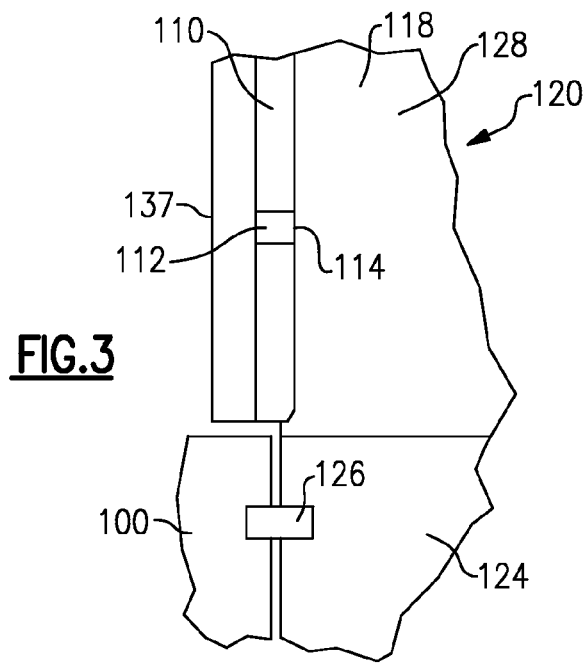
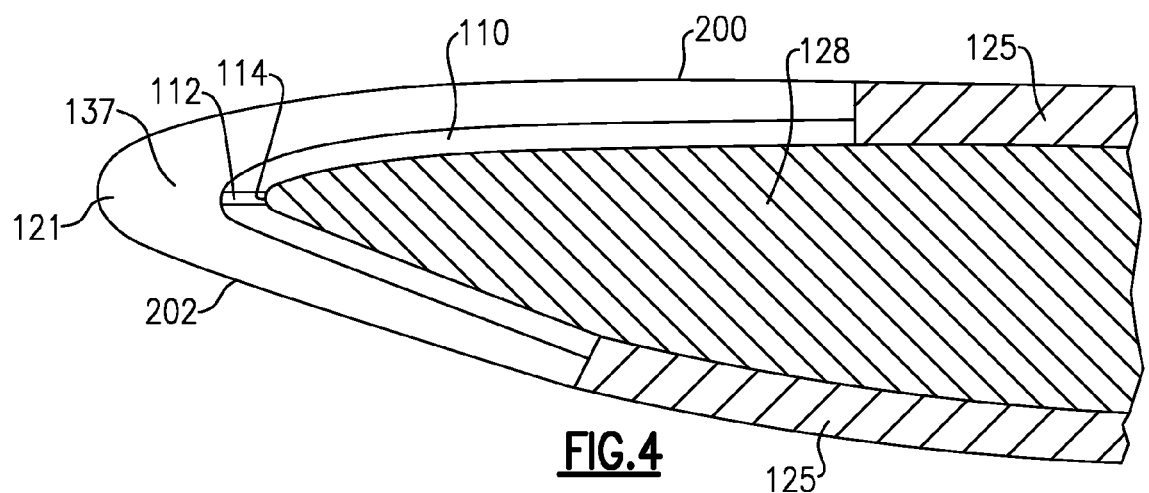
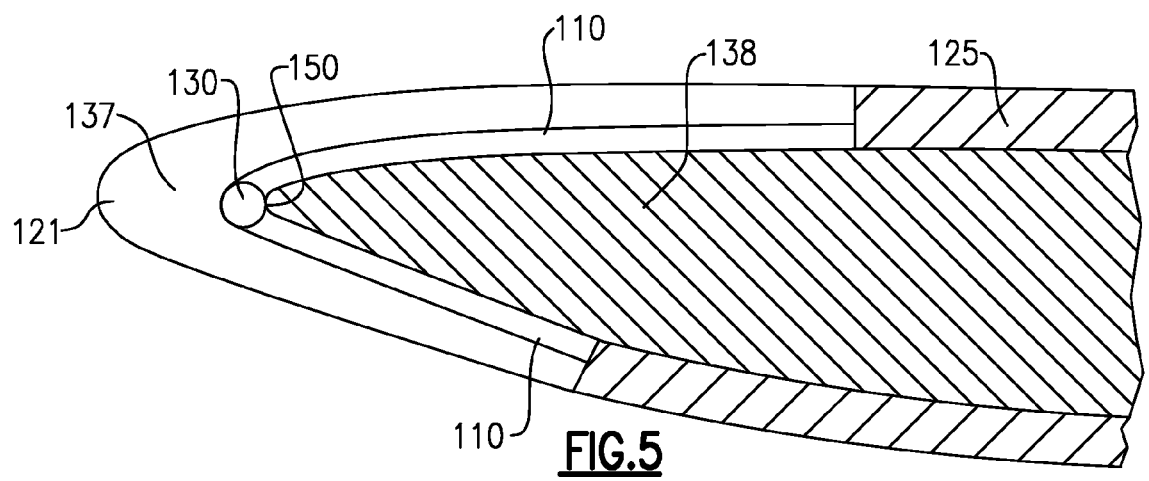

ELECTRICAL GROUNDING FOR BLADE SHEATH

BACKGROUND OF THE INVENTION

This application relates to a structure for electrically grounding fan blades for use in a gas turbine engine.

Gas turbine engines are known, and typically include a fan delivering air into a compressor section. In the compressor section, the air is compressed and then delivered into a combustion section. The compressed air is mixed with fuel and burned in the combustion section. Products of this combustion pass downstream to drive turbine rotors.

The fan blades are subject to a large volume of air moving across an airfoil, and this can build up a large static electric charge. Conventionally, the fan blades were formed of a conductive metal that was grounded to a hub that mounts the fan blade. As such, the charge would dissipate.

More recently, fan blades have become larger. One factor allowing the larger fan blades is the use of a gear reduction between a turbine driven spool which drives the fan blade and the spool. The gear reduction allows a single turbine rotor to drive both a compressor section and the fan, but at different speeds.

As the size of the fan blade has increased, its weight has also increased. As such, efforts have been made to reduce the weight of fan blades. One modification is to change the material for the fan blade from titanium to an aluminum.

The use of the aluminum for the fan blade has also led to the provision of a titanium sheath at a leading edge of the main body of the fan blade. The titanium sheath is attached to the main body with an adhesive. The adhesive is electrically insulating. The titanium sheath is not grounded to the fan blade due to the insulating adhesive.

SUMMARY

In a featured embodiment, a blade for use in an airfoil includes a leading edge and a trailing edge. A sheath is positioned at the leading edge, and is secured to the airfoil by a first adhesive formed of a first material. The sheath is formed of a second material that is distinct from the first material, which is less electrically conductive than the second material. A grounding element is in contact with the sheath, and a portion of the airfoil formed of a third material that is more electrically conductive than the first material. The grounding element and portion of the airfoil together form a ground path from the sheath into the airfoil.

In another embodiment according to the previous embodiment, the second material includes titanium, and the third material is aluminum.

In another embodiment according to any of the previous embodiments, the airfoil extends outwardly of a platform in a radial dimension, and between suction and pressure sides to define a lateral dimension. The grounding element is at a location between the sheath and airfoil, which is positioned both laterally and radially inwardly of portions of the first adhesive.

In another embodiment according to any of the previous embodiments, the grounding element is a metal piece that is secured to the sheath and airfoil.

In another embodiment according to any of the previous embodiments, the grounding element is a second adhesive which is more conductive than the first adhesive.

In another embodiment according to any of the previous embodiments, the second adhesive includes silver-filled silicone.

In another embodiment according to any of the previous embodiments, the blade is a fan blade.

In another featured embodiment, a rotor for use in a gas turbine engine has a slot receiving a blade. The blade includes an airfoil and a dovetail. The dovetail is received in the slot. The airfoil includes a leading edge and a trailing edge. A sheath is positioned at the leading edge, and is secured to the airfoil by a first adhesive formed of a first material. The sheath is formed of a second material that is distinct from the first material. The first material is less electrically conductive than the second material. A grounding element is in contact with the sheath, and is in contact with a portion of the airfoil formed of a third material that is more electrically conductive than the first material. The grounding element and portion of the airfoil together form a ground path from the sheath into the airfoil.

In another embodiment according to any of the previous embodiments, the second material includes titanium. The third material is aluminum.

In another embodiment according to any of the previous embodiments, the airfoil extends outwardly of a platform in a radial dimension, and between suction and pressure sides to define a lateral dimension. The grounding element is at a location between the sheath and the airfoil, which is positioned both laterally and radially inwardly of portions of the first adhesive.

In another embodiment according to any of the previous embodiments, the grounding element is a metal piece secured to the sheath and airfoil.

In another embodiment according to any of the previous embodiments, the grounding element is a second adhesive which is more conductive than the first adhesive.

In another embodiment according to any of the previous embodiments, the second adhesive includes silver-filled silicone.

In another embodiment according to any of the previous embodiments, the blade is a fan blade and the rotor is a fan rotor.

In another featured embodiment, a gas turbine engine has a fan section, a compressor section, a combustor section, and a turbine section. The turbine section has at least one rotor for driving a compressor rotor of the compressor section, and also for driving a fan rotor of the fan section through a gear reduction. The fan section includes a rotor having a slot receiving a fan blade. The fan blade has a dovetail received in the slot and an airfoil. The airfoil includes a leading edge and a trailing edge. A sheath is positioned at the leading edge, and is secured to the airfoil by a first adhesive formed of a first material. The sheath is formed of a second material that is distinct from the first material. The first material is less electrically conductive than the second material. A grounding element is in contact with the sheath, and is in contact with a portion of the airfoil formed of a third material that is more electrically conductive than the first material. The grounding element and portion of the airfoil together form a ground path from the sheath into the airfoil.

In another embodiment according to any of the previous embodiments, the second material includes titanium. The third material is aluminum.

In another embodiment according to any of the previous embodiments, the airfoil extends outwardly of a platform in a radial dimension, and is between suction and pressure sides to define a lateral dimension. The grounding element is at a location between the sheath and airfoil, which is positioned both laterally and radially inwardly of portions of the first adhesive.

In another embodiment according to any of the previous embodiments, the grounding element is a metal piece which is secured to the sheath and airfoil.

In another embodiment according to any of the previous embodiments, the grounding element is a second adhesive which is more conductive than the first adhesive.

In another embodiment according to any of the previous embodiments, the second adhesive includes silver-filled silicone.

These and other features of this application will be best understood from the following specification and drawings, the following of which is a brief description.

BRIEF DESCRIPTION OF THE DRAWINGS

FIG. 1B shows an aluminum fan blade.
FIG. 1C shows the aluminum fan blade mounted into a rotor.
FIG. 2 is a cross-sectional view along line 2-2 of FIG. 1B.
FIG. 3 shows an embodiment of this invention.
FIG. 4 is another view of the FIG. 3 embodiment.
FIG. 5 shows another embodiment.

DETAILED DESCRIPTION

Figure 1A:
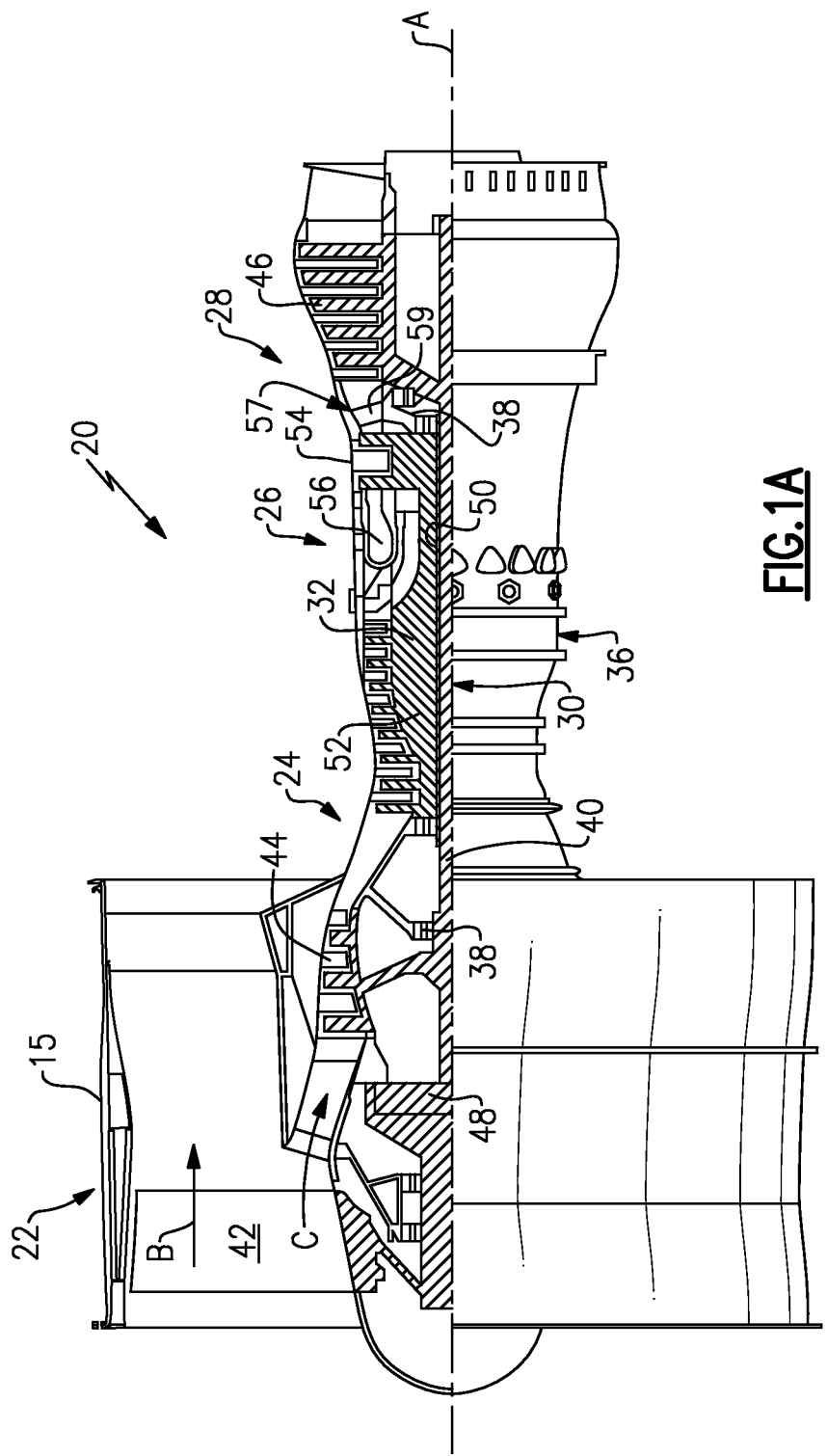
FIG. 1A shows an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B in a bypass duct formed within a nacelle 15. The compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram°R)/(518.7°R)]^{0.5}$. The "Low corrected fan tip speed" as disclosed herein according to one non-limiting embodiment is less than about 1150 ft/second.

A fan blade 120 is illustrated in FIG. 1B having an airfoil 118 extending radially outwardly from a dovetail or root 124. A leading edge 121 and a trailing edge 122 define the forward and rear limits of the airfoil 118.

As shown in FIG. 1C, a fan rotor 116 has a slot 125 that receives the dovetail 124 to mount the fan blade 120 with the airfoil 118 extending radially outwardly. As the rotor is driven to rotate, it carries the fan blade 120 with it. As shown in FIG. 1C, a lock ring 100 locks the blades 120 within the rotor 116.

FIG. 2 shows a cross-section of the fan blade 120 at the airfoil 118. Notably, in practice the airfoil cross-section may include channels or other hollows, and filler materials. As shown, the leading edge 121 carries a sheath or cap 137 secured to a main body 128.

There is also a suction side 200 and a pressure side 202. The main body 128 may be formed of aluminum or various aluminum alloys. The main body 128 may be coated with protective coatings, such as a polyurethane coating 125, see FIGS. 4 and 5. In addition, fabric wear pads may be placed on the aluminum.

The sheath 137 may be formed of a conductive material, such as titanium, titanium alloys or other appropriate metals.

An adhesive 110 (see FIGS. 3-5) secures the sheath 137 to the main body 128. The adhesive is electrically insulating and thus the sheath is not grounded to the main body 128. Electric charge may thus build up in the sheath 137.

FIG. 3 shows an embodiment for grounding the sheath 137. FIG. 3 is along a radial direction of the blade 120, and illustrates the airfoil 118, and the dovetail 124. The sheath 137 is secured to the main body 128 by an adhesive 110, which is non-conductive. A metal piece 112, formed of some material which is conductive, is secured to the sheath, and contacts an aluminum portion 114 of the underlying blade, bridging the non-conductive adhesive 110.

The adhesive 110, isolates the metal piece 112 in this radial direction such that rainwater or other liquids will not contact the metal piece 112. In the absence of leakage, there will not be galvanic corrosion to the underlying main body 128.

A grounding element 126 is shown schematically and grounds the dovetail 124, and hence the blade 120, to the lock ring 100. Thus, the sheath 137 is grounded to the blade 120, and the blade 120 is grounded to the lock ring 100, which in turn is grounded to the rotor 116.

FIG. 4 shows a view between the pressure side 202 and suction side 200. Again, a layer 110 of adhesive secures the sheath 137 to the underlying main body 128 of the blade 120. The metal piece 112 directly contacts aluminum in the main body 128. In this manner, the sheath 137 is grounded to the main body 128. Again, in this lateral cross-section, the adhesive 110 will isolate the metal piece 112 from the elements.

FIG. 5 shows another embodiment where an adhesive 110 connects the sheath 137 to the main blade body 128. The adhesive 110 is generally non-conductive. A conductive adhesive portion 130 is positioned at a location which will be isolated from the elements in both the lateral and radial dimensions, similar to the embodiment of FIGS. 3 and 4. The conductive adhesive portion 130 contacts a portion 150 of main body 138.

For purposes of this application, the conductive adhesive 130 is "conductive" in that it is more conductive than the adhesive 110 which connects the sheath 137 to the main blade body 128 over the bulk of connecting area.

As can be appreciated from FIGS. 3, 4 and 5, the grounding elements, the metal piece 112, or the conductive adhesive portion 130, are positioned both radially and laterally inward of portions of adhesive 110.

Suitable conductive adhesives include silver-filled silicone room temperature vulcanizing (RTV) rubber components. Suitable non-conductive adhesives include epoxy or urethane adhesives.

For purposes of this application, adhesive 110 may be referred to as a being formed of a first material, whereas the sheath 137 is formed of a second material, and the main body 128 is formed of a third material. The second and third materials are more electrically conductive than the first material.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A blade for use in a gas turbine engine comprising:
   an airfoil including a leading edge and a trailing edge,
   a sheath positioned at the leading edge, said sheath being secured to said airfoil by a first adhesive formed of a first material,
   said sheath being formed of a second material that is distinct from said first material, said first material being less electrically conductive than said second material;
   a grounding element in contact with said sheath, and said grounding element being in contact with a forward portion of a main body of said airfoil, said main body of said airfoil being formed of a third material that is more electrically conductive than said first material,
   said grounding element and said main body of said airfoil together forming a ground path from said sheath into said airfoil; and
   said airfoil extending outwardly to define a radial dimension, and said airfoil extending between suction and pressure sides to define a lateral dimension, and
   said grounding element disposed at a location between said sheath and said forward portion of the main body of said airfoil,
   the grounding element being positioned both laterally and radially inward of portions of said first adhesive to isolate said grounding element from liquids.

2. The blade as set forth in claim 1, wherein said second material includes titanium, and said third material is aluminum.

3. The blade as set forth in claim 1, wherein said grounding element is a metal piece which is secured to said sheath and said forward portion of the main body of said airfoil.

4. The blade as set forth in claim 1, wherein said grounding element is a second adhesive which is more conductive than said first adhesive.

5. The blade as set forth in claim 4, wherein said second adhesive includes silver-filled silicone.

6. The blade as set forth in claim 1, wherein said blade is a fan blade.

7. A rotor for use in a gas turbine engine comprising:
   a rotor having a slot receiving a blade, said blade including an airfoil and a dovetail, said dovetail received in said slot;
   said airfoil including a leading edge and a trailing edge, a sheath positioned at the leading edge, said sheath being secured to said airfoil by a first adhesive formed of a first material, said sheath being formed of a second material that is distinct from said first material, said first material being less electrically conductive than said second material;
   a grounding element in contact with said sheath, and said grounding element being in contact with a forward portion of a main body of said airfoil, said main body of said airfoil being formed of a third material that is more electrically conductive than said first material, said grounding element and said main body of said airfoil together forming a ground path from said sheath into said airfoil; and
   said airfoil extending outwardly to define a radial dimension, and said airfoil extending between suction and pressure sides to define a lateral dimension, and said grounding element disposed at a location between said sheath and said forward portion of the main body of said airfoil, said grounding element being positioned both laterally and radially inward of portions of said first adhesive to isolate said grounding element from liquids.

8. The rotor as set forth in claim 7, wherein said second material includes titanium, and said third material is aluminum.

9. The rotor as set forth in claim 7, wherein said grounding element is a metal piece which is secured to said sheath and said forward portion of the main body of said airfoil.

10. The rotor as set forth in claim 7, wherein said grounding element is a second adhesive which is more conductive than said first adhesive.

11. The rotor as set forth in claim 10, wherein said second adhesive includes silver-filled silicone.

12. The rotor as set forth in claim 7, wherein said blade is a fan blade and said rotor is a fan rotor.

13. A gas turbine engine comprising:
- a fan section, a compressor section, a combustor section, and a turbine section, said turbine section having at least one rotor for driving a compressor rotor of said compressor section, and also driving a fan rotor of said fan section through a gear reduction;
- said fan rotor having a slot receiving a fan blade, said fan blade having a dovetail received in said slot and an airfoil, said airfoil including a leading edge and a trailing edge, a sheath positioned at the leading edge, said sheath being secured to said airfoil by a first adhesive formed of a first material, said sheath being formed of a second material that is distinct from said first material, said first material being less electrically conductive than said second material;
- a grounding element in contact with said sheath, and said grounding element being in contact with a forward portion of a main body of said airfoil, said main body of said airfoil being formed of a third material that is more electrically conductive than said first material, said grounding element and said main body of said airfoil together forming a ground path from said sheath into said airfoil; and
- said airfoil extending outwardly to define a radial dimension, and said airfoil extending between suction and pressure sides to define a lateral dimension, and said grounding element disposed at a location between said sheath and said forward portion of the main body of said airfoil, the grounding element being positioned both laterally and radially inward of portions of said first adhesive to isolate said grounding element from liquids.

14. The gas turbine engine as set forth in claim 13, wherein said second material includes titanium, and said third material is aluminum.

15. The gas turbine engine as set forth in claim 13, wherein said grounding element is a metal piece which is secured to said sheath and said forward portion of the main body of said airfoil.

16. The as turbine engine as set forth in claim 13, wherein said grounding element is a second adhesive which is more conductive than said first adhesive.

17. The gas turbine engine as set forth in claim 16, wherein said second adhesive includes silver-filled silicone.

* * * * *